United States Patent [19]

Pichl

[11] 4,098,218
[45] Jul. 4, 1978

[54] OUTBOARD MOTOR WITH REMOVABLE COMBINATION FUEL TANK AND SHROUD

[75] Inventor: Heinz Pichl, Uppsala, Sweden

[73] Assignee: AB Volvo Penta, Gothenburg, Sweden

[21] Appl. No.: 787,350

[22] Filed: Apr. 14, 1977

[30] Foreign Application Priority Data

Apr. 28, 1976 [SE] Sweden ............................... 7604869

[51] Int. Cl.² .......................................... B63H 21/26
[52] U.S. Cl. ........................................ 115/17; 280/5 A
[58] Field of Search .......................... 115/17, 18 R; 123/195 P; 280/5 A; 137/614.05; 224/42.25

[56] References Cited

U.S. PATENT DOCUMENTS

| 1,691,509 | 11/1928 | Ashworth | 280/5 A |
| 1,721,476 | 7/1929 | Soley | 224/42.25 |
| 1,883,201 | 10/1932 | Wheeler | 137/614.05 X |
| 2,256,831 | 9/1941 | Kavey | 115/18 R |
| 2,501,470 | 3/1950 | Krueger et al. | 115/17 |

FOREIGN PATENT DOCUMENTS

| 1,510,002 | 1/1968 | France | 280/5 A |

*Primary Examiner*—Trygve M. Blix
*Assistant Examiner*—Sherman D. Basinger
*Attorney, Agent, or Firm*—George H. Baldwin; Arthur G. Yeager

[57] ABSTRACT

An outboard motor having a removable fuel tank and engine shroud member, quick detachable means for attaching the member to the engine and for permitting removal thereof for use as a portable fuel canister. The member is provided with an automatic valve which closes upon such removal, a manual safety shut off for the valve, and a carrying handle for carrying the motor when the member is attached and for carrying the member as a canister when it is detached.

11 Claims, 5 Drawing Figures

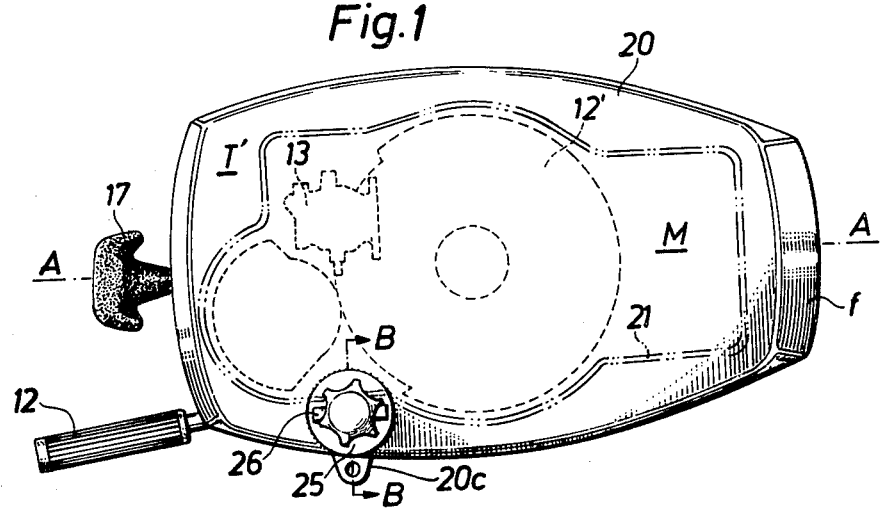
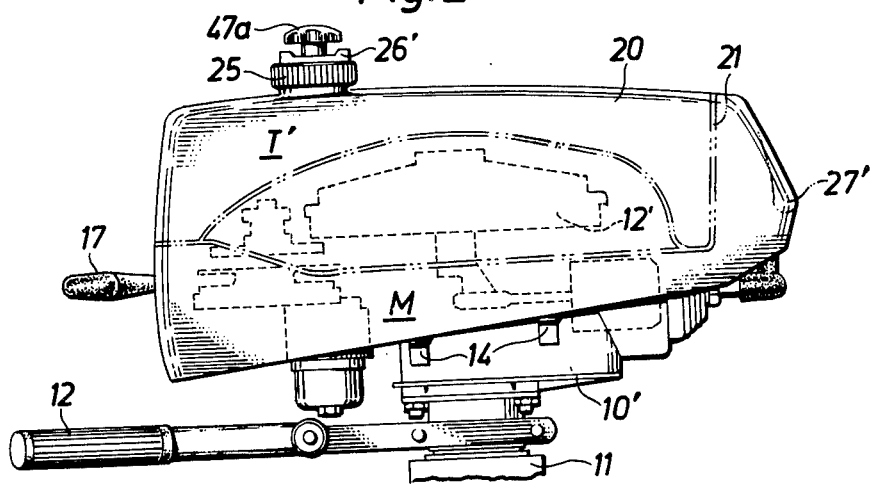

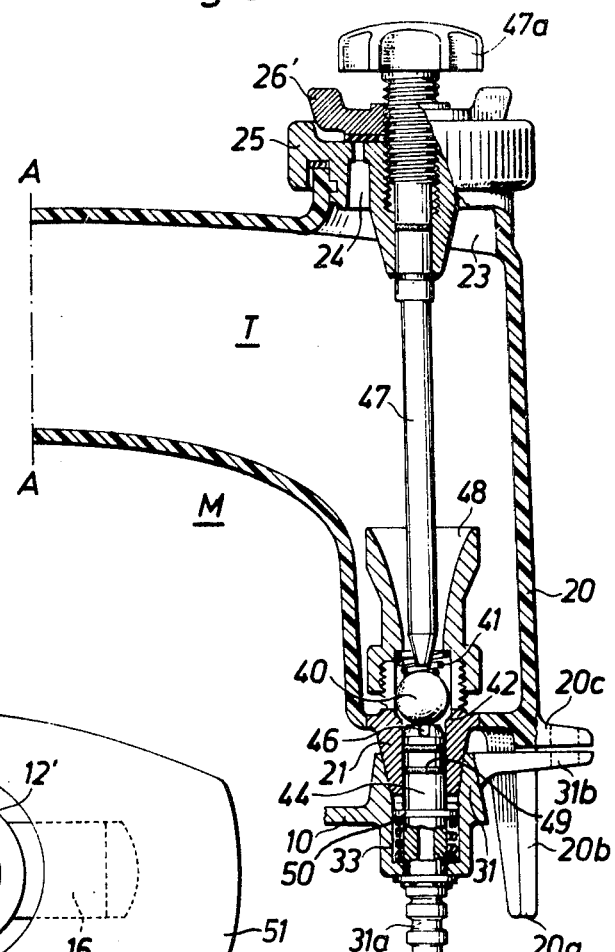
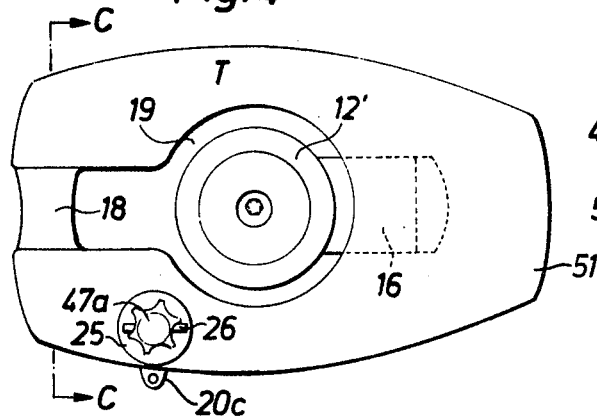
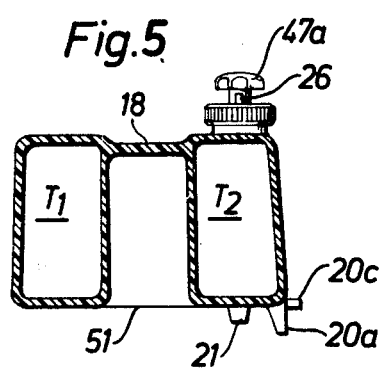

OUTBOARD MOTOR WITH REMOVABLE COMBINATION FUEL TANK AND SHROUD

The invention relates to a new arrangement for smaller outboard motors where a fuel tank, provided with filling, venting and outlet openings, is arranged directly on the upper part of the engine, contrary to arrangements in larger outboard motors, where the fuel tank is placed somewhere else in the boat and connected to the engine by a feeding hose.

Regardless of size, most outboard motors are removably attached to the boat transom by means of conventional quicklock devices or screw fasteners or the like, operating, for example, according to the toggle joint principle, in order that the motor may be readily demountable and mountable.

With smaller motors the fuel tank is arranged fixedly below the housing or adjacent thereto and cannot be demounted without more or less extensive demounting work. The arrangement is rather inexpensive but implies the drawback that in rough water the filling of fuel is very troublesome and the consumption of fuel is higher than normal since a certain amount of fuel is frequently spilled during filling of the tank. It is, furthermore, troublesome to transport such an outboard motor in the luggage compartment of a car since the fuel tends to leak from the tank or carburetor. In order to overcome such drawbacks, separate so called pressure tanks have been constructed where the fuel is supplied to the motor by pressurizing the tank. This solution, however, is accompanied by another disadvantage in that there is a risk of leakage in a conduit containing fluid under pressure. Therefore, increasingly, outboard motors are being equipped with separate tanks and special fuel pumps to pump the fuel to the carburetor. Constructions having separate tanks demand more space, and more troublesome in manipulation and more expensive, since, for instance, with tanks mounted on the motor, the fuel supply occurs automatically by gravitation, without the need of any special pump. Besides, outboard motor fuel tanks arranged inside the boat pose increased fire risk, since gasoline vapors flowing out from the venting opening may collect in the bilge of the boat which situation cannot occur when the tank is placed above the motor outboard of the transom.

The object of the present invention is to eliminate the drawbacks mentioned above, and specifically to avoid those drawbacks encountered in previous arrangements in which the fuel tank is disposed at or adjacent to the upper part of the outboard motor.

The invention provides, advantageously, that, for filling the tank, the tank may be removed from the motor in simple fashion and becomes, then, a readily carried canister which may be filled on a dock or ashore. When for instance in unforseen situations it is necessary to fill the tank at a gasoline station for cars located a longer distance from the tie-up place of the boat, no special or extra gasoline can or canister for carrying the fuel is necessary. However, the invention also contemplates further advantages. Due to the fact that after tying-up, the tank readily may be taken home, effective protection against fuel theft is achieved. To a certain extent, also, protection against stealing of the motor itself is achieved as it is inoperative without a tank. Furthermore, in the coupling between the tank and the motor, according to a feature of the invention, a locking element is built-in in such a way that a mounted tank may be locked to the motor, or, when the tank is removed, the locking element may be used to prevent the removed tank, or any similar tank of the same type which has been taken from another motor, to be put on to the motor from which the tank has been removed, so that the motor remains inoperative.

Generally, conventional fixed outboard motor tanks are of a relatively small volume in order to give the motor housing an aesthetic shape. According to the invention, several fuel tanks of different volume with correspondingly different sizes of the motor housings which embody such tanks may be provided for one and the same motor, so that when, for instance, going out on an expedition or long cruise, a tank and housing of conventional volume may be replaced by a tank of larger volume.

Due to better corrosion resistivity and lower cost, boat motor gasoline tanks to an increasing extent are being manufactured of plastics instead of metal. However, authorities in several countries have forbidden the use of plastic tanks of larger volume than about 5 liters. When a boat having a motor according to the invention provided with a plastic tank of a capacity in excess of 5 liters is moved to waters where such tank is not allowed, it is necessary according to the invention, only to replace the tank, either by a smaller plastic tank or by a metal tank of the larger capacity.

The novel features which are believed to be characteristic of this invention are set forth particularity in the appended claims. The invention itself, however, both as to its organization and method of operation, together with further objects and advantages thereof, may best be understood by reference to the following description taken in connection with the accompanying drawings, in which:

FIG. 1 is a plan view of an outboard motor with a fuel tank mounted on the engine of the motor according to the preferred first embodiment of the invention, portions of the engine being represented in broken lines;

FIG. 2 is a side elevational view of the motor of FIG. 1, the leg portion of the motor being broken away and portions of the engine being shown in broken lines;

FIG. 3 is a sectional view on an enlarged scale taken along line B—B of FIG. 1;

FIG. 4 is a top view of an outboard motor, with certain portions omitted for clarity, according to a second embodiment of the invention; and FIG. 5 is a sectional view of the removable tank according to the second embodiment taken along line C—C of FIG. 4.

In the embodiment according to FIGS. 1 and 2, the broken, dotted lines show the upper construction parts of the outboard engine 10' located above the transom-mounted leg 11 and the steering handle 12 of the outboard motor. The engine 10' comprises, as shown, for instance, the carburetor 13 and the flywheel 12' and these parts are hidden behind or shrouded by housing 20, which by quicklock members 14 (FIG. 2) is attached to the engine. Said quicklock member may be of an arbitrary conventional type, for instance screw or over-center connectors or fasteners operating according to the toggle joint principle, or the like. On the flywheel 12' there is wound a starting cord (not shown) which is operable by the handle 17.

By dashdot lines having double dots, a partition wall 21 inside of the combination engine housing and tank 20 is shown which divides the interior space of the tank into two regions, of which the central region M (FIG.

1) which at the same time is the lowest region (FIG. 2), is open downwardly and accommodates the engine and the upper parts thereof, respectively while the peripheral portion T' (FIG. 1), which at the same time is the uppermost portion (FIG. 2), is closed and forms the tank space. The tank space T' embraces the engine space completely, from above and laterally so that from all sides, except for from below, the upper parts of the engine are completely embraced by the tank and shroud or housing 20. The tank thus forms a mantle or shroud that surrounds and overlies the engine, and the fuel in the tank therefore forms an efficient sound and vibration attenuation means. This arrangement is suitable for water cooled motors where no cooling air intakers are needed.

As best seen in FIG. 3, the tank is provided with an outlet opening in the form of frusto-conical outlet nipple 21 for connection to the fuel intake opening socket element 31 of the engine in a manner which is further described hereinafter. The tank is provided with the filling opening 23, a closure cap 25 and a venting air intake opening 24. The outlet nipple 21 of the tank embodies a check valve having a ball-shaped valve element 40. The valve element 40 is urged by a compression spring 41 downwardly against a valve seat 42. Below said seat a thickwalled tube member 44, having an axial bore and an inlet recess 46, is arranged slidingly in the nipple 21 and is sealed therein by means of O-rings 49. The downwardly projecting outlet nipple 21 is well protected against mechanical damage when mounting or when the tank is removed from the engine due to the downwardly extending side walls 20a of the engine shroud and tank 20. In the fuel inlet connection socket for the engine, there is arranged a circular flange 50 unitary with and extending outwardly from the tube 44, and a compression spring 33, which underlies the flange and which is stronger than the spring 41 is disposed below the flange so that when mounting the tank, the spring 33 raises the tube 44 via the flange and the tube member raises the valve element 40, thereby to permit fuel to flow between said ball valve element and the seal 42 and through the recesses 46, formed across the upper end of the tube and communicating with the bore 52, into the bore in tube 44 and thence, via a hose connection end portion 31a of the tube 44 to a supply hose (not shown) leading to the carburetor 13. In order to permit manual positive closing of the outlet opening 21, a locking rod 47, having a manual operating knob 47a, is screwed into the cap 25. The lower end of the rod 47 is directed, by a generally frusto-conical open bottom cup member 48 which extends upwardly from valve seat 42, into alignment with the ball valve member 40. By screwing the rod 47 in a downward direction, force from the rod is applied to the valve member 40 to overcome the stronger spring 33 and to seat the valve member against valve seat 42. Thus, the locking rod 47 with the maneuvering knob 47a as a manual fuel cut-off valve when the fuel tank is in position on the engine in the boat.

From the above description it is clear that, even if the locking rod 47 is not screwed down to close the valve, the check valve in the outlet opening 21 will be closed automatically when the tank is removed from the inlet opening 31 of the engine by the then unopposed action of spring 41 against the valve member. There is, furthermore, a lock nut 26', preferably a wing nut, threaded on rod 47 above the cap 25 which allows closing of the vent opening 24. When said opening 24 is closed, and for absolute safety possibly also the locking rod 47 is screwed down, the demounted tank may be stored in any arbitrary position, transported in a car, or otherwise handled without any risk of leakage.

The tank is provided with a carrier handle 27' (FIG. 2) in the shape of a suitably profiled wall edge portion f (FIG. 1) unitary with and spaced from the rearward end of the tank. The hand is passed below said edge f and into the downwardly open recess defined thereby to grasp the thicker rounded portion of the handle 27'. With the tank latched in place on the engine, the handle 27' serves as a carrying handle for the motor.

The construction according to the invention preferably further comprises a locking device which, not only secures a mounted tank against unauthorized removal, but also can be used to make it impossible to attach, for instance, a spare tank of the same type when the tank of the motor is removed. In the embodiment disclosed a very simple construction is shown where a conventional padlock is used. Adjacent the fuel inlet socket 31 a loop or perforated ear 31b is provided, preferably integral with the inlet socket. The socket and ear constitute fixed portions of the engine. The loop or ear is arranged to receive the bail of a suitable padlock (not shown). The tank and shroud 20 is also provided with a similar perforated ear or loop 20c integral therewith and cooperative with ear or tab 31b. Ear or tab 20c also includes downwardly extending legs 20a which define a downwardly open slot 20b therebetween for receiving ear 31b. The legs thus serve to align nipple 21 with the opening 31 when mounting the tank. The loops or ears 20c and 31b are so arranged that they will be closely adjacent and will provide aligned openings for passage of a padlock bail when the tank is in proper operative position on the engine thereby to permit locking of the tank on the engine. When the tank has been removed, the padlock may be locked through loop 31b so that, until the padlock has been removed, no other tank of similar type can be mounted sufficiently tightly for fuel to flow from the tank to the engine.

It will be seen that the legs 20a extend below the lower end of nipple 21 thereby to protect the nipple when the tank is being handled or is placed on a floor or shelf or the like.

The embodiment according to FIGS. 4 and 5 is intended for outboard motors with air cooled engines. The left hand forward portion of the tank T in FIG. 4 has the divided shape according to FIG. 5, where two tank side portions $T_1$ and $T_2$ are shown to be interconnected by a bridge 18. At the right hand or rearward portion of the tank as seen in FIG. 4, the tank portions $T_1$ and $T_2$ merge together as seen at 51. The tank thus has a generally horse-shoe shape with forwardly extending wings $T_1$ and $T_2$ outwardly around the sides and rear of the engine. The tank and cover T of this embodiment has a top opening 19 of generally keyhole shape including a circular portion outwardly around the engine flywheel 12' and a forwardly extending generally rectangular portion between the flywheel 12' and the tank bridge portion 18.

Through said opening 19 cooling air may flow to the cylinder or cylinders 16 of the engine below the tank. The space under bridge portion 18 is also open for air flow and to provide space for parts of the engine.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In an outboard motor having a propeller leg and drive and transom attachment means attached to an upper end portion of said leg, said means including an engine, a fuel tank provided with a fill opening and cap, quick detachable means removably attaching said tank to said engine, said tank having a fuel outlet opening and a valve disposed in said outlet opening, said engine having a fuel inlet conduit, second quick detachable means for connecting said conduit to said tank in communication with said outlet opening, an outwardly extending perforate locking tab integrally attached to said tank, and a second perforate tab integral with said engine cooperative with and positioned immediately adjacent said first tab and with its perforation aligned with the perforation of said first tab when said tank is in position for such removable attachment to said engine.

2. The combination according to claim 1 wherein a pair of legs defining a slot therebetween is integrally attached to one of said tabs and said legs are disposed to cage the other said tab therebetween when said tank is in said position.

3. The combination according to claim 2 wherein said legs are integrally attached to said first tab and extend downwardly from said tank, wherein said tank comprises a downwardly extending outlet nipple through which said outlet opening extends disposed adjacent said legs, said legs and said nipple having respective lower ends and the lower end of at least one said leg being lower than said lower end of said nipple.

4. In an outboard motor having a propeller leg and drive and transom attachment means attached to an upper end portion of said leg, said means including an engine, a fuel tank provided with a fill opening and cap, quick detachable means removably attaching said tank to said engine, said tank having a fuel outlet opening and a valve disposed in said outlet opening, said engine having a fuel inlet conduit, quick detachable means for connecting said conduit to said tank in communication with said outlet opening, said valve comprising a valve seat surrounding said outlet opening, a valve member disposed inwardly of said seat, a spring urging said valve member toward said seat, said conduit being provided with a valve-member-engaging element which enters said outlet opening and contacts said valve member for forcing said valve member from said seat when said conduit is connected to said tank, said tank comprising a downwardly extending outlet nipple through which said outlet opening extends, said valve seat being disposed with said nipple, and said tank being further provided with a downwardly extending protective leg adjacent to said nipple.

5. In an outboard motor having a propeller leg and drive and transom attachment means attached to an upper end portion of said leg, said means including an engine, a fuel tank provided with a fill opening and cap, quick detachable means removably attaching said tank to said engine, said tank having a fuel outlet opening and a valve disposed in said outlet opening, said engine having a fuel inlet conduit, second quick detachable means for connecting said conduit to said tank in communication with said outlet opening, said valve comprising a valve seat surrounding said outlet opening, a valve member disposed inwardly of said seat, a spring urging said valve member toward said seat, said conduit being provided with a valve-member-engaging element which enters said outlet opening and contacts said valve member for forcing said valve member from said seat when said conduit is connected to said tank, and a rod having a manually operable upper end portion threaded downwardly through said cap with its said upper end portion exposed thereabove, said rod having a lower end in said tank, and said valve member being disposed above its said seat and alignedly beneath and engageable by said lower end.

6. The combination according to claim 5 wherein said cap and rod are removable from said tank, and wherein said tank is provided internally with a cup-like rod-end-directing member having an open top, a downwardly tapering interior and an open bottom directed toward said valve member, said directing member being arranged to receive said lower end and to direct it into such alignment when said cap and rod are being positioned on said tank after such removal.

7. In an outboard motor having a propeller leg and drive and transom attachment means attached to an upper end portion of said leg, said means including an engine, a fuel tank provided with a fill opening and cap, quick detachable means removably attaching said tank to said engine, said tank having a fuel outlet opening and a valve disposed in said outlet opening, said engine having a fuel inlet conduit, quick detachable means for connecting said conduit to said tank in communication with said outlet opening, said valve comprising a valve seat surrounding said outlet opening, a valve member disposed inwardly of said seat, a spring urging said valve member toward said seat, said conduit being provided with a valve-member-engaging element which enters said outlet opening and contacts said valve member for forcing said valve member from said seat when said conduit is connected to said tank, said valve-member-engaging element being movable longitudinally in said conduit, and spring means disposed in said conduit biasing said valve-member-engaging element in a direction outwardly of said conduit and toward said valve member, the biasing force of said spring means being greater than the force of said spring.

8. The combination according to claim 7 wherein a rod having a manually operable upper end is threaded downwardly through said cap with its said upper end portion exposed thereabove, said rod having a lower end is said tank, and wherein said valve member is disposed above its said seat and alignedly beneath and engageable by said lower end, whereby manual screwing down of said rod forces said valve member downwardly onto its said seat against the biasing force of said spring means.

9. In an outboard motor having a propeller leg and drive and transom attachment means attached to an upper end portion of said leg, said means including an engine, an integral housing and fuel tank member comprising a single continuous outer wall and at least one internal partition wall dividing said member into an enclosed tank space and a partially open handle and engine space, said engine and said member having front and rear ends, a rearward portion of said ouer wall bounding said partially open space and constituting a carrying handle, said member being provided with a fuel filling opening into said tank space and a fuel outlet opening from said tank space, an automatically closing valve carried by said member in said outlet opening, said engine and member having manually operable quicklock means for releasably retaining said member on said engine in predetermined position, said engine comprising fuel conduit means entering said outlet opening and actuating said valve into open position when said member is in said predetermined position, and a fuel filling opening closure cap attachable to said member, said cap being provided with a vent opening therethrough and comprising manually operable closing means for closing said vent opening, whereby said member serves as a fuel tank and shroud for said engine and said handle provided a carrying handle for said motor when said member is so retained on said engine in said predetermined position, and, when said cap is in place, said vent is closed, said quicklock means are opened and said member is removed from said engine thereby to close said valve in said outlet opening, said member serves as a portable ansate fuel canister.

10. The combination according to claim 9 wherein said engine includes a flywheel and said tank space overlies said flywheel when said member is in said predetermined position.

11. In an outboard motor having a propeller leg and drive and transom attachment means attached to an upper end portion of said leg, said means including an engine, an integral housing and fuel tank member comprising a single continuous outer wall and at least one internal partition wall dividing said member into an enclosed tank space and a partially open engine space, said engine and said member having front and rear ends, a rearward portion of said outer wall bounding said partially open space, said member being provided with a carrying handle and being further provided with a fuel filling opening into said tank space and a fuel outlet opening from said tank space, an automatically closing valve carried by said member in said outlet opening, said engine and member having manually operable quicklock means for releasably retaining said member on said engine in predetermined position, said engine comprising fuel conduit means entering said outlet opening and actuating said valve into open position when said member is in said predetermined position, and a fuel filling opening closure cap attachable to said member, said cap being provided with a vent opening therethrough and comprising manually operable closing means for closing said vent opening, whereby said member serves as a fuel tank and shroud for said engine and said handle provides a carrying handle for said motor when said member is so retained on said engine in said predetermined position, and, when said cap is in place, said vent is closed, said quicklock means are opened and said member is removed from said engine thereby to close said valve in said outlet opening, said member serves as a portable ansate fuel canister.

* * * * *